United States Patent
Moriyama et al.

(10) Patent No.: US 11,032,519 B2
(45) Date of Patent: Jun. 8, 2021

(54) SERVER AND PROGRAM

(71) Applicant: DWANGO Co., Ltd., Tokyo (JP)

(72) Inventors: Shohei Moriyama, Tokyo (JP); Yuji Yasuda, Tokyo (JP); Shota Sakuragi, Tokyo (JP)

(73) Assignee: DWANGO Co., Ltd., Tokyo (JP)

(*) Notice: Subject to any disclaimer, the term of this patent is extended or adjusted under 35 U.S.C. 154(b) by 0 days.

(21) Appl. No.: 16/609,022

(22) PCT Filed: Dec. 12, 2018

(86) PCT No.: PCT/JP2018/045672
§ 371 (c)(1),
(2) Date: Oct. 28, 2019

(87) PCT Pub. No.: WO2019/117196
PCT Pub. Date: Jun. 20, 2019

(65) Prior Publication Data
US 2020/0145618 A1    May 7, 2020

(30) Foreign Application Priority Data

Dec. 14, 2017 (JP) .............................. JP2017-239711

(51) Int. Cl.
*H04N 21/2187* (2011.01)
*H04N 21/258* (2011.01)
(Continued)

(52) U.S. Cl.
CPC ..... *H04N 7/17318* (2013.01); *H04N 21/2187* (2013.01); *H04N 21/25891* (2013.01);
(Continued)

(58) Field of Classification Search
CPC ........... H04N 21/4532; H04N 21/2393; H04N 21/2747
See application file for complete search history.

(56) References Cited

U.S. PATENT DOCUMENTS

| | | | |
|---|---|---|---|
| 2005/0204388 A1* | 9/2005 | Knudson | H04N 21/482 725/58 |
| 2010/0229209 A1 | 9/2010 | Okazaki | |
| 2017/0332135 A1* | 11/2017 | Stark | H04N 21/23113 |

FOREIGN PATENT DOCUMENTS

| | | |
|---|---|---|
| CN | 1739292 A | 2/2006 |
| CN | 105898340 A | 8/2016 |

(Continued)

OTHER PUBLICATIONS

Translation of International Search Report dated Feb. 26, 2019 and Written Opinion in corresponding application No. PCT/JP2018/045672; 9 pgs.

(Continued)

*Primary Examiner* — Hsiungfei Peng
(74) *Attorney, Agent, or Firm* — Maier & Maier, PLLC

(57) ABSTRACT

A server includes a storage unit, a determination unit, and a notification unit. The storage unit stores content identification information and interrupted spot information in association with user identification information in a case where the viewing of a content during live distribution is interrupted in a first terminal logged in using the user identification information. The determination unit determines whether or not the content identification information and/or the interrupted spot information that are associated with the user identification information are stored in the storage unit in a case where the server is accessed from a second terminal logged in using the user identification information after the viewing is interrupted. In a case where such information is stored in the storage unit, the notification unit notifies the second terminal that the viewing of the content can be restarted from a viewing interrupted spot by time shift reproduction.

5 Claims, 5 Drawing Sheets

(51) Int. Cl.
*H04N 21/2743* (2011.01)
*H04N 21/2747* (2011.01)
*H04N 21/45* (2011.01)
*H04N 21/4788* (2011.01)
*H04N 21/6587* (2011.01)
*H04N 21/81* (2011.01)
*H04N 7/173* (2011.01)

(52) U.S. Cl.
CPC ..... *H04N 21/4532* (2013.01); *H04N 21/4788* (2013.01); *H04N 21/812* (2013.01)

(56) References Cited

FOREIGN PATENT DOCUMENTS

| | | |
|---|---|---|
| CN | 106454389 A | 2/2017 |
| CN | 106841326 A | 6/2017 |
| JP | 2010-206482 A | 9/2010 |
| JP | 2017-108389 A | 6/2017 |
| WO | 2004/066622 A1 | 8/2004 |

OTHER PUBLICATIONS

Notice of Reasons for Refusal dated Feb. 20, 2018 in corresponding application No. 2017-239711, 6 pgs.
Decision to Grant a Patent dated Apr. 10, 2018 in corresponding application No. 2017-239711, 5 pgs.

* cited by examiner

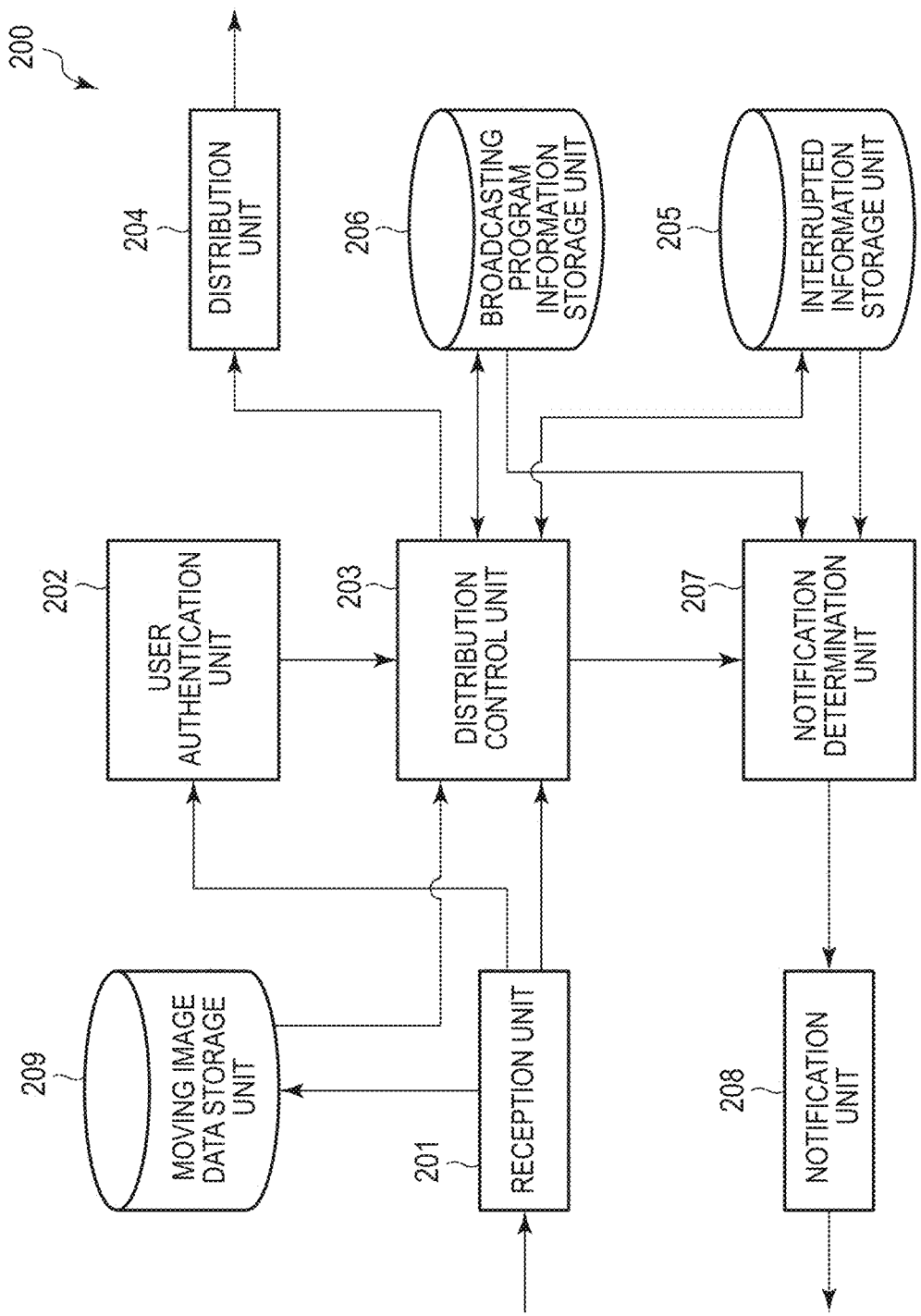

FIG.3

| IDENTIFICATION INFORMATION OF USER | IDENTIFICATION INFORMATION OF INTERRUPTED LIVE BROADCASTING PROGRAM | INTERRUPTED SPOT INFORMATION |
|---|---|---|
| USER A | LIVE BROADCASTING PROGRAM 1 | 12:34 |
| USER B | NONE | NONE |
| USER C | LIVE BROADCASTING PROGRAM 2 | 5:43 |
| ... | ... | ... |

FIG.4

| IDENTIFICATION INFORMATION OF USER | IDENTIFICATION INFORMATION OF INTERRUPTED LIVE BROADCASTING PROGRAM | INTERRUPTED SPOT INFORMATION | TERMINAL IDENTIFICATION INFORMATION |
|---|---|---|---|
| USER A | LIVE BROADCASTING PROGRAM 1 | 12:34 | TERMINAL α |
| USER B | NONE | NONE | NONE |
| USER C | LIVE BROADCASTING PROGRAM 2 | 5:43 | TERMINAL β |
| ... | ... | ... | ... |

FIG.5

| IDENTIFICATION INFORMATION OF USER | IDENTIFICATION INFORMATION OF INTERRUPTED LIVE BROADCASTING PROGRAM |
|---|---|
| USER A | LIVE BROADCASTING PROGRAM 1 |
| USER B | NONE |
| USER C | LIVE BROADCASTING PROGRAM 2 |
| ... | ... |

SERVER AND PROGRAM

FIELD

The present invention relates to a resume function in a moving image sharing system.

BACKGROUND

Recently, a resume function may be implemented as one of extension functions of a moving image sharing system (refer to "Notice of Starting "Resume Reproduction (Reproduction from Continuation)" Function Provision", [search on Nov. 29, 2017], <URL:http://blog.nicovideo.jp/niconews/363.html>). Resume originally indicates one of functions of a personal computer (PC). Specifically, the resume indicates a function of storing working state of a memory immediately before a power source of a PC body is turned off, and thus, of enabling the working to be rapidly restarted when the power source of the PC body is turned on next.

In addition, the resume may indicate one of extension functions in data download. Specifically, download resume indicates a function of restarting the download of undownloaded data in a case where the download of data is interrupted due to some reasons such as communication disconnection or power off. As described above, the resume indicates a function of approximately "restarting the working from a location in which the working is stopped once".

On the other hand, the resume in the moving image sharing system is a function of recording a viewing interrupted spot in a case where the viewing is interrupted, for example, by voluntarily stopping the viewing or erroneously closing the window while a user is viewing a certain moving image, and of restarting the reproduction of the moving image from the previous viewing interrupted spot in a case where the moving image is selected again. In addition, the resume function can be validated regardless of a terminal by managing the viewing interrupted spot on the basis of an account. For example, it is possible to restart the viewing of the moving image on a smart phone in a bed room after watching the moving image halfway on a television in a living room.

The resume function in the moving image sharing system is validated by selecting again the moving image of which the viewing is interrupted by the user. In other words, for example, in a case where the user forgets about the moving image of which the viewing is interrupted by reason that a long period of time elapses after the user interrupts the viewing, the resume function is not utilized, and the user misses the moving image. In addition, even in a case where the user remembers the moving image of which the viewing is interrupted, a labor hour such as the confirmation of viewing history and keyword search is required to select again the moving image.

In JP-A-2008-167251, it is disclosed that in a content reproduction device capable of rapidly displaying a content video of a viewing interrupted part as a preview image ([0017]), a VOD program is started to be executed (S010), it is determined whether or not there is resume information (S040), a content guide screen to which the resume information is added is displayed (S070), and a viewer selects a content (S080) (FIG. 2, [0070] to [0087]).

SUMMARY

A function of displaying the content guide screen to which the resume information is added, described in JP-A-2008-167251, is targeted for the VOD program, that is, an archive moving image that is accumulated in advance in a server, and can be viewed at all times. On the other hand, such a function is not targeted for a real-time content such as a live distribution moving image.

Recently, in a part of the moving image sharing system, a distributor is capable of live-distributing (may also be referred to as live broadcasting) a captured moving image to a plurality of users through the internet. In such a real-time content, on the nature thereof, in principle, it is not possible for a user to experience again a part of which the viewing is interrupted by the user as an equivalent real-time content afterwards. As described above, the real-time content has a great loss on viewing experience due to miss, compared to the archive moving image. In addition, it is not possible to directly apply the resume in the moving image sharing system of the related art to the real-time content.

An object of the invention is to support viewing restart of a user who interrupts viewing of a real-time content.

According to one aspect of the invention, a server includes a storage unit, a determination unit, and a notification unit. The storage unit stores first content identification information for identifying a first content and first interrupted spot information indicating a viewing interrupted spot of the first content in association with first user identification information for identifying a first user in a case where viewing of the first content during live distribution is interrupted in a first terminal logged in a content sharing service by using the first user identification information. The determination unit determines whether or not at least one of the content identification information and the interrupted spot information that are associated with the first user identification information is stored in the storage unit in a case where the server is accessed from a second terminal logged in the content sharing service by using the first user identification information after the viewing of the first content is interrupted in the first terminal. The notification unit notifies the second terminal that the viewing of the first content is capable of being restarted from the viewing interrupted spot by time shift reproduction in a case where it is determined that at least one of the first content identification information and the first interrupted spot information is stored in the storage unit by being associated with the first user identification information.

According to another aspect of the invention, a server includes a storage unit, a determination unit, and a notification unit. The storage unit stores first content identification information for identifying a first content and first interrupted spot information indicating a viewing interrupted spot of the first content in association with first user identification information for identifying a first user in a case where viewing of the first content during live distribution is interrupted in a first terminal logged in a content sharing service by using the first user identification information. The determination unit (a) determines whether or not at least one of the content identification information and the interrupted spot information that are associated with the first user identification information is stored in the storage unit in a case where the server is accessed from a second terminal logged in the content sharing service by using the first user identification information after the viewing of the first content is interrupted in the first terminal, and (b) further determines whether or not the live distribution of the first content is ended in a case where it is determined that at least one of the first content identification information and the first interrupted spot information is stored in the storage unit by being associated with the first user identification information. The notification unit notifies the second terminal that the first content is capable of being viewed in the live distribution in a case where it is determined that at least one of the first content identification information and the first interrupted spot information is stored in the storage unit by being associated with the first user identification information, and the live distribution of the first content is not ended.

According to still another aspect of the invention, a server includes a storage unit and a control unit. The storage unit stores first content identification information for identifying a first content and first interrupted spot information indicating a viewing interrupted spot of the first content in association with first user identification information for identifying a first user in a case where viewing of the first content during live distribution is interrupted in a first terminal logged in a content sharing service by using the first user identification information. The control unit controls distribution of the first content such that in a case where time shift reproduction of the first content is requested to the server from a second terminal logged in the content sharing service by using the first user identification information after the viewing of the first content is interrupted in the first terminal, the second terminal is capable of restarting the viewing of the first content from the viewing interrupted spot by the time shift reproduction.

According to the invention, it is possible to support viewing restart of a user who interrupts viewing of a real-time content.

BRIEF DESCRIPTION OF THE DRAWINGS

FIG. 2 is a block diagram illustrating a distribution server according to the embodiment.

FIG. 3 is a diagram illustrating an example of an interrupted information table that is stored in an interrupted information storage unit of FIG. 2.

FIG. 4 is a diagram illustrating another example of the interrupted information table that is stored in the interrupted information storage unit of FIG. 2.

FIG. 5 is a diagram illustrating still another example of the interrupted information table that is stored in the interrupted information storage unit of FIG. 2.

DETAILED DESCRIPTION

Figure 1:
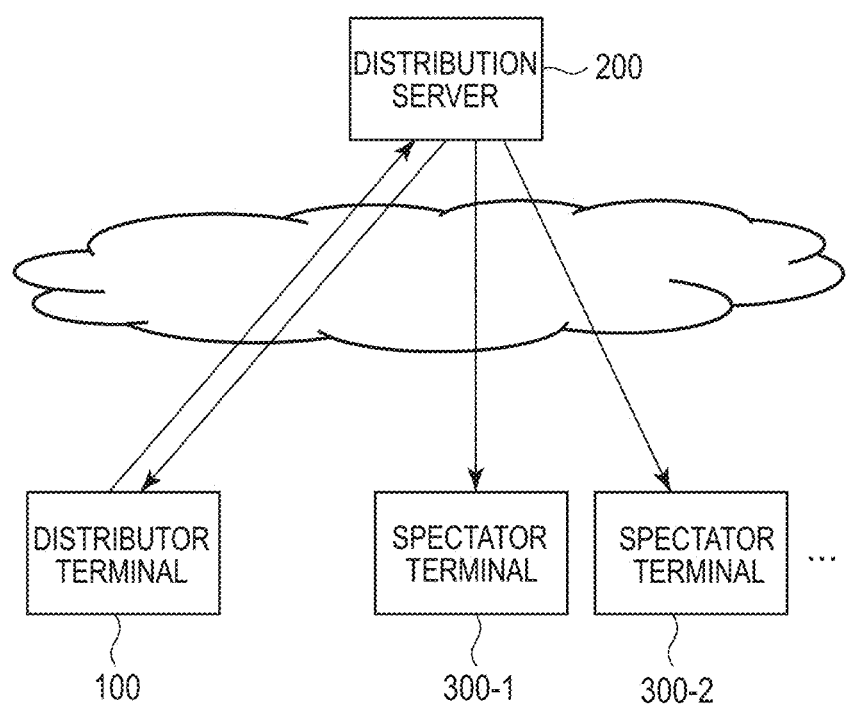
FIG. 1 is a block diagram illustrating a live distribution system of a moving image according to an embodiment.

Hereinafter, the embodiment will be described with reference to the drawings. Furthermore, hereinafter, identical or similar reference numerals will be applied to elements identical or similar to elements that have been described, and the repeated description will be basically omitted. For example, in a case where there are a plurality of identical or similar elements, there is a case where common reference numerals are used in order to describe the embodiment without distinguishing each of the elements, and there is also a case where branch numbers are used in addition to the common reference numerals in order to describe the embodiment by distinguishing each of the elements.

Embodiment

A server according to an embodiment can be built in a system for providing a content sharing service such as a moving image sharing service, and specifically, in a live distribution system of a moving image that is illustrated in FIG. 1. In the following description, a moving image (hereinafter, simply referred to as a live broadcasting program) that is live-distributed through the internet is assumed, but the invention is not limited to the live broadcasting program, and the server can be applied to a live distribution system of other real-time contents. The live distribution system includes a distributor terminal 100, a distribution server 200, and spectator terminals 300-1, 300-2, . . . .

The distribution server 200 is connected to the distributor terminal 100 and the spectator terminal 300 through a network, and is capable of transmitting and receiving data with respect to the distributor terminal 100 and the spectator terminal 300. Furthermore, the number of devices illustrated in FIG. 1 is merely an example. For example, the number of spectator terminals 300 can be 0, or can be several hundreds or several thousands. The distributor terminal 100 may not be connected to the distribution server 200 before the start and after the end of the live distribution of the live broadcasting program. In addition, a Web server or a comment distribution server that is not illustrated in FIG. 1 may be further provided, and the function thereof may be built in the distribution server 200. On the contrary, a part of functions that are described as the function of the distribution server 200 (for example, a user authentication function or the like) may be built in a server (not illustrated).

The distributor terminal 100, for example, can be an electronic device such as a computer connected to a moving image source such as a video camera, for example, a television set (including an internet television), a PC, a mobile terminal (for example, a tablet, a smart phone, a laptop, a feature phone, a portable gaming console, a digital music player, an electronic reading device, and the like), a virtual reality (VR) terminal, an augmented reality (AR) terminal, and the like, but is not limited thereto. The distributor terminal 100 sequentially transmits encoded moving image data that is output from the moving image source to the distribution server 200.

The distribution server 200 receives the encoded moving image data that is sequentially transmitted from the distributor terminal 100. Then, the distribution server 200 distributes the moving image data to the distributor terminal 100 and the spectator terminal 300 that distribute or view the moving image data. The spectator terminal 300 can be the same electronic device as the distributor terminal 100, but it is not necessary that the spectator terminal 300 is connected to the moving image source, unlike the distributor terminal 100.

The distribution server 200 is accessed from the spectator terminal 300 at various timings. For example, the distribution server 200 receives an acquisition request of the page of the moving image sharing service (for example, the top page of the moving image sharing service or other predetermined pages, and the last page that was opened by the spectator terminal 300), and the like from the spectator terminal 300. The acquisition request of the page, for example, can be transmitted to the distribution server 200 by the spectator terminal 300 through a network at the time of page transition or page update, at the time of being logged in the moving image sharing service, at the time when an application of the moving image sharing service is launched, or at the time when the spectator terminal 300 returns from a sleep state in a state where the application is launched. The distribution server 200 transmits page data to the spectator terminal 300 in accordance with the acquisition request, and the spectator terminal 300, for example, displays a screen including a link with respect to a viewable live broadcasting program, on the basis of the page data. A user selects a link with respect to a favorite live broadcasting program, and thus, is capable of starting the viewing of the live broadcasting program.

The distribution server 200 confirms whether or not there is a live broadcasting program of which the viewing is interrupted by the user of the spectator terminal 300 at the time of receiving the acquisition request of such a page, and in a case where there is the live broadcasting program of which the viewing is interrupted, sends a notification relevant to the live broadcasting program to the spectator terminal 300. Accordingly, it is possible to remind the user of the live broadcasting program of which the viewing is interrupted, and to accelerate the return with respect to the live broadcasting program, or time shift reproduction or the reservation of the live broadcasting program. Here, the time shift reproduction is a function of enabling the recorded broadcasting program to be viewed afterwards but not the live broadcasting program itself, and is already practically used in apart of the moving image sharing system.

Furthermore, the distribution server 200 may use not only the acquisition request of the page but also the overall access with respect to the distribution server 200 as a trigger for determining the necessity of the notification. However, in the following description, conveniently, the reception of the acquisition request of the page is used as the trigger for determining the necessity of the notification.

Hereinafter, the configuration and the operation of the distribution server 200 in FIG. 1 will be sequentially described by using the drawings.

The distribution server 200 is a computer, and includes a processor performing distribution control of the moving image data that is received from the distributor terminal 100, the determination of the necessity of the notification described above and the execution thereof, and the like, and a memory temporarily storing a program that is executed by the processor for realizing such processing, data that is used by the processor, and the like.

Further, the distribution server 200 is capable of using a communication device for connection with respect to a network, and an auxiliary storage device for accumulation of large volumes of data. The communication device and the auxiliary storage device may be built in the distribution server 200, or may be externally attached to the distribution server 200.

The communication device communicates with the distributor terminal 100 and the spectator terminal 300 through a network. For example, the communication device receives the moving image data from the distributor terminal 100, or transmits a response with respect to the request from the spectator terminal 300.

The auxiliary storage device, for example, accumulates data such as information of the live broadcasting program, the moving image data of the live broadcasting program, and interrupted information described below. It is preferable that the auxiliary storage device, for example, is a non-volatile storage medium such as a hard disk drive (HDD) and a solid state drive (SSD). The auxiliary storage device can be a file server that is connected to the distribution server 200 through a network.

Next, a configuration example of the distribution server 200 will be described by using FIG. 2. The distribution server 200 of FIG. 2 includes a reception unit 201, a user authentication unit 202, a distribution control unit 203, a distribution unit 204, an interrupted information storage unit 205, a broadcasting program information storage unit 206, a notification determination unit 207, a notification unit 208, and a moving image data storage unit 209.

The reception unit 201 receives various data items, for example, a log-in request with respect to the moving image sharing service, the acquisition request of the page, a distribution request of a moving image, the moving image data of the live broadcasting program, and the like from the distributor terminal 100 and the spectator terminal 300. The reception unit 201 may be the communication device described above, or may be an interface with respect to the communication device.

The reception unit 201, for example, receives the log-in request with respect to the moving image sharing service from the spectator terminal 300. The log-in request includes user identification information for identifying the user (for example, a user name or the like), and an information element that is used in the authentication (for example, a password, biological information, and the like). The reception unit 201 sends the received log-in request to the user authentication unit 202.

In addition, the reception unit 201 receives the acquisition request of the page and/or the distribution request of the moving image from the spectator terminal 300, and sends the request to the distribution control unit 203. Further, the reception unit 201 receives the moving image data of the live broadcasting program from the distributor terminal 100, and also sends the moving image data to the distribution control unit 203. Furthermore, the reception unit 201 may store the moving image data of the live broadcasting program in the moving image data storage unit 209 in order to enable the time shift reproduction. On the other hand, in a case where the moving image sharing service does not support the time shift reproduction of the live broadcasting program, and in a case where the live broadcasting program does not support the time shift reproduction, the moving image data storage unit 209 can be unnecessary.

The user authentication unit 202 receives the log-in request from the reception unit 201. The user authentication unit 202 collates a combination of the user identification information that is included in the log-in request, and the information element that is used in the authentication, with a user database that is constructed in advance, and determines whether or not to permit/reject the log-in. As described above, even in a case where the user uses the moving image sharing service by using different spectator terminals 300, it is possible to perform a suitable notification with respect to the live broadcasting program of which the viewing is interrupted by the user, by managing the account of the user. The user authentication unit 202 notifies an authentication result to the distribution control unit 203.

The distribution control unit 203 performs various controls relevant to the distribution of the moving image data and/or the page data. Here, the moving image data is capable of including both of the moving image data of the live broadcasting program that is received by the reception unit 201, and the moving image data for the time shift reproduction that is stored in the moving image data storage unit 209. The distribution control unit 203 may be the processor and the memory described above.

Furthermore, the distribution control unit 203 may be divided into a function unit for control relevant to the distribution of the moving image data, and a function unit for control relevant to the distribution of the page data. Further, such function units may be built in a separate server, for example, the distribution server 200 and a Web server (not illustrated), respectively.

For example, the distribution control unit 203 sends the moving image data and/or the page data, and information indicating the spectator terminal 300 that is a distribution destination (a destination address) to the distribution unit 204. Accordingly, the spectator terminal 300 is capable of displaying the page of the moving image sharing service, or reproducing the moving image data of the live broadcasting program. The distribution control unit 203 directly receives the moving image data from the reception unit 201, or sends the moving image data to the distribution unit 204, at the time of the live distribution. On the other hand, the distribution control unit 203 reads out the moving image data from the moving image data storage unit 209, and sends the moving image data to the distribution unit 204, at the time of the time shift reproduction.

In addition, the distribution control unit 203 receives the acquisition request of the page of the moving image sharing service from the reception unit 201, and receives the result of the user authentication from the user authentication unit 202. The distribution control unit 203 sends the user identification information for identifying the user of the spectator terminal 300 that is a transmission source of the acquisition request to the notification determination unit 207. Here, the user identification information, for example, can be used when the spectator terminal 300 is logged in the moving image sharing service. Accordingly, as described below, the necessity of the notification with respect to the spectator terminal 300 is determined, and in a case where it is determined that the notification is necessary, the notification is performed. Here, the distribution control unit 203 sends terminal identification information for identifying the spectator terminal 300 that is a transmission source of the acquisition request of the page to the notification determination unit 207, in addition to the user identification information.

Furthermore, it is not necessary all of such measures are performed with respect to the acquisition request, and for example, such measures may be performed only with respect to the acquisition request that is initially received after the latest log-in of the spectator terminal 300, or may be performed only with respect to the acquisition request that is initially received after the spectator terminal 300 and the distribution server 200 are temporarily disconnected and are connected again. Accordingly, it is possible to reduce the load of the distribution server 200 while a minimum notification is performed with respect to the spectator terminal 300.

In addition, in a case where the viewing of the live broadcasting program during the distribution is interrupted in the logged-in spectator terminal 300, the distribution control unit 203 stores content identification information for identifying the live broadcasting program and interrupted spot information indicating a viewing interrupted spot, for example, in a hour-minute-second format, in the interrupted information storage unit 205 in association with the user identification information for identifying the user of the spectator terminal 300.

The interrupted spot information is useful to determine a viewing restart point in the time shift reproduction of the live broadcasting program. However, in a case where the moving image sharing service does not support the time shift reproduction itself of the live broadcasting program, or the time shift reproduction from the viewing interrupted spot, as described below, the interrupted spot information may not be stored in the interrupted information storage unit 205.

In addition, in a case where the time shift reproduction request of the live broadcasting program is received from the logged-in spectator terminal 300, the distribution control unit 203 may determine whether or not the live broadcasting program is the live broadcasting program of which the viewing is interrupted by the user of the spectator terminal 300, on the basis of the information stored in the interrupted information storage unit 205. Then, in a case where the live broadcasting program that is a request target is the live broadcasting program that the user is viewing, the distribution control unit 203 controls the distribution of the live broadcasting program such that the spectator terminal 300 is capable of restarting the viewing of the live broadcasting program from the viewing interrupted spot by the time shift reproduction. Further, the distribution control unit 203 reads and writes the information of the live broadcasting program in the broadcasting program information storage unit 206, and manages information such as the live broadcasting program during the distribution, the live broadcasting program to be distributed in the future, and the live broadcasting program distributed in the past.

The distribution unit 204 distributes the moving image data and/or the page data that are designated to the distribution destination that is designated by the distribution control unit 203 (any one of the spectator terminals 300). The distribution unit 204 may be the communication device described above, or may be the interface with respect to the communication device.

Furthermore, the distribution unit 204 may be divided into a function unit for distributing the moving image data and a function unit for distributing the page data. Further, such function units may be built in a separate server, for example, the distribution server 200 and the Web server (not illustrated), respectively.

The interrupted information storage unit 205 stores the information of the live broadcasting program of which the viewing is interrupted by the user for each user of the moving image sharing service. The information stored in the interrupted information storage unit 205 is read out by the notification determination unit 207 in order to determine the necessity of the notification with respect to the spectator terminal 300. The interrupted information storage unit 205 may be the auxiliary storage device described above, or may be the interface with respect to the auxiliary storage device.

In the interrupted information storage unit 205, for example, an interrupted information table illustrated in FIG. 3 can be stored by the distribution control unit 203. In the interrupted information table of FIG. 3, the content identification information of the live broadcasting program of which the viewing is interrupted and the interrupted spot information are associated with each of the user identification information items. The notification determination unit 207 described below is capable of determining whether or not there is a live broadcasting program of which the viewing is interrupted by a given user, and then, of determining the viewing interrupted spot thereof, with reference to the interrupted information table.

For example, in a case where the acquisition request of the page is received from the logged-in spectator terminal 300 as a user A, the notification determination unit 207 is capable of determining that the user A interrupts the viewing of a live broadcasting program 1 at a spot of 12 minutes 34 seconds. Similarly, in a case where the acquisition request of the page is received from the logged-in spectator terminal 300 as a user B, the notification determination unit 207 is capable of determining that there is no live broadcasting program that is viewed by the user B.

An example of the interrupted information table is not limited to FIG. 3. Specifically, as illustrated in FIG. 4, the information of the live broadcasting program of which the viewing is interrupted, and the terminal identification information for identifying the spectator terminal 300 that is used by the user when the viewing is interrupted may be registered in the interrupted information table by being associated with the user identification information. Accordingly, the notification determination unit 207 is capable of determining whether or not the spectator terminal 300 that is used by the user when the viewing is interrupted is identical to the spectator terminal 300 that transmits the acquisition request of the page after the viewing is interrupted, in addition to the determination described above.

For example, in a case where the acquisition request of the page is received from the logged-in spectator terminal 300 (a terminal γ) as a user C, the notification determination unit 207 is capable of determining that the user C interrupts the viewing of the live broadcasting program 2 at a spot of 5 minutes 43 seconds, and the spectator terminal 300 (a terminal β) that is used at this time is not identical to the current spectator terminal 300 (the terminal γ).

In addition, in a case where the moving image sharing service does not support the time shift reproduction itself of the live broadcasting program, or the time shift reproduction from the viewing interrupted spot, the interrupted spot information may not be stored in the interrupted information storage unit 205. In this case, in the interrupted information table, as illustrated in FIG. 5, the content identification information may be stored by being associated with the user identification information. Accordingly, the notification determination unit 207 is capable of determining whether or not there is a live broadcasting program of which the viewing is interrupted by the given user.

For example, in a case where the acquisition request of the page is received from the logged-in spectator terminal 300 as the user A, the notification determination unit 207 is capable of determining that the user A interrupts the viewing of the live broadcasting program 1. Similarly, in a case where the acquisition request of the page is received from the logged-in spectator terminal 300 as the user B, the notification determination unit 207 is capable of determining that there is no live broadcasting program that is viewed by the user B.

Further, in the example of FIG. 5, terminal information may be stored in addition to the content identification information. Accordingly, as with the example of FIG. 4, it is possible to determine whether or not the spectator terminal 300 that is used by the user when the viewing is interrupted is identical to the spectator terminal 300 that transmits the acquisition request of the page after the viewing is interrupted.

Furthermore, in the interrupted information storage unit 205, content identifiers (or the like) of a plurality of live broadcasting programs may be stored by being associated with one user identification information item. In this case, in order to save the capacity of the interrupted information storage unit 205, for example, the notification determination unit 207 may delete the content identifier of the live broadcasting program that is notified once to a predetermined of times. Alternatively, there may be an upper limit in the number of content identifiers of the live broadcasting program that can be associated with one user identification information item, and the distribution control unit 203 may delete the content identifier of the live broadcasting program in chronological order of a stored timing, as necessary. In addition, in the examples of FIG. 3 to FIG. 5, in a case where there is no information of the live broadcasting program that is associated with the user identification information, a value of "none" is registered, but this is merely an example. For example, from the viewpoint of saving the capacity of the interrupted information storage unit 205, in a case where there is no information of the live broadcasting program that is associated with the user identification information, the user identification information and the information of the live broadcasting program that is associated with the user identification information may be registered in the interrupted information table. In this case, the notification determination unit 207 may determine whether or not the user identification information is stored in the interrupted information storage unit 205.

The broadcasting program information storage unit 206 stores the information of the live broadcasting program that is distributed/that has been distributed in the moving image sharing service. The information stored in the broadcasting program information storage unit 206 can be read out by the notification determination unit 207 in order to determine the details of the notification with respect to the spectator terminal 300. The broadcasting program information storage unit 206 may be the auxiliary storage device described above, or may be the interface with respect to the auxiliary storage device.

The information of the live broadcasting program, for example, is capable of including a distribution start date and time and a distribution end (scheduled) date and time of the live broadcasting program, information indicating whether or not the time shift reproduction of the live broadcasting program can be performed, and the like. For example, the notification determination unit 207 compares the current date and time with the distribution end (scheduled) date and time of the live broadcasting program, and thus, is capable of determining whether or not the (live) distribution of the live broadcasting program is ended. In addition, the notification determination unit 207 is capable of determining whether or not to notify the spectator terminal 300 that the time shift reproduction of the live broadcasting program can be performed, from the information indicating whether or not the time shift reproduction of the live broadcasting program can be performed.

In addition, examples of the information of the live broadcasting program are capable of including information for identifying the live broadcasting program and/or a distributor thereof, metadata applied to the live broadcasting program (for example, a moving image tag (a keyword), a sponsor name, and a broadcasting program category), a distributor comment, a descriptive text, attribute information of the live broadcasting program and/or the distributor, the number of spectators and/or the number of comments of the live broadcasting program, thumbnail image data of the live broadcasting program, a comment posted on the live broadcasting program, and the like.

The notification determination unit 207 receives the user identification information for identifying the user of the spectator terminal 300 that is the transmission source of the acquisition request of the page from the distribution control unit 203. The notification determination unit 207 determines the necessity of the notification with respect to the spectator terminal 300 and the details of the notification, by using the user identification information. The notification determination unit 207 may be the processor and the memory described above.

Specifically, the notification determination unit 207 determines whether or not the information of the live broadcasting program associated with the user identification information is stored in the interrupted information storage unit 205, that is, whether or not there is the live broadcasting program that is a notification target. Here, the information of the live broadcasting program can be one or both of the content identification information and the interrupted spot information. In a case where it is determined that the information of the live broadcasting program associated with the user identification information is stored in the interrupted information storage unit 205, the notification determination unit 207 instructs the notification unit 208 to perform the notification.

In addition, in the determination of the necessity of the notification, the notification determination unit 207 may consider an elapsed time (an interrupted time) from the viewing interruption. Specifically, in a case where the elapsed time after the information of the live broadcasting program is stored in the interrupted information storage unit 205 by being associated with the user identification information until the acquisition request of the page is received is less than a threshold value, the notification determination unit 207 may not instruct the notification unit 208 to perform the notification. As a result thereof, the notification unit 208 omits the notification. As described above, a frequency of performing the notification in consideration of the elapsed time from the viewing interruption decreases, and thus, it is possible to prevent a situation in which a dedicated notification may give a bad impression to the user. For example, in a case where the interrupted time is a short period of time, and the user remembers the live broadcasting program of which the viewing is interrupted, there is a concern that the user may be annoyed due to the notification.

However, in a case where the spectator terminal 300 is different between a time when the viewing is interrupted and the current time, a change in a viewing environment of the user is large, compared to a case where the spectator terminal 300 is the same between the time when the viewing is interrupted and the current time, and thus, it is difficult for the user to remember the live broadcasting program of which the viewing is interrupted. Therefore, for example, in a case where the spectator terminal 300 is different between the time when the viewing is interrupted and the current time, the threshold value described above may decrease, compared to a case where the spectator terminal 300 is the same between the time when the viewing is interrupted and the current time, or the notification may be performed regardless of the interrupted time. Furthermore, such a change in the spectator terminal can be determined by storing the terminal identification information in the interrupted information storage unit 205, in addition to the information of the live broadcasting program when the viewing of the live broadcasting program is interrupted, and by comparing the terminal identification information with the terminal identification information of the spectator terminal that is the transmission source of the acquisition request of the page.

As described above, the necessity of the notification is determined in consideration of the interrupted time or a change in the spectator terminal, and thus, for example, the notification is performed in various situations described below, and it is possible to remind the user of the presence of the live broadcasting program of which the viewing is interrupted.

(1) At the time of viewing a part of the live broadcasting program on a TV in a living room, and of launching a moving image viewing application of a portable gaming console in the own room (at the time of moving to an individual space from a common space).

(2) At the time of viewing a part of the live broadcasting program on TV or a PC at home, and of launching a moving image viewing application of a smart phone while on the go, or vice versa (at the time of going out or coming home).

(3) At the time of viewing a part of the live broadcasting program on a PC at a desk, and of launching the moving image viewing application of the portable gaming console in bed (a change in an active state).

(4) At the time of viewing a part of the live broadcasting program on the portable gaming console in the morning or before bedtime, of switching the portable gaming console to a sleep state, and of returning the portable gaming console from the sleep state at night or after wake-up (using the same terminal at intervals).

Furthermore, in a case where the notification unit 208 is capable of performing a plurality of types of notifications, the notification determination unit 207 may determine the details of the notification of the notification unit 208. Specifically, the notification unit 208 may notify that the viewing of the live broadcasting program of which the viewing is interrupted can be restarted from the viewing interrupted spot by the time shift reproduction, or may notify that the live broadcasting program of which the viewing is interrupted can be viewed in the live distribution (that is, return to the live distribution of the live broadcasting program). Alternatively, the notification unit 208 may notify that there is the live broadcasting program of which the viewing is interrupted, may notify information for specifying the live broadcasting program of which the viewing is interrupted, or may notify that the time shift reproduction of the live broadcasting program of which the viewing is interrupted or the reservation thereof can be performed. Furthermore, the notification determination unit 207, for example, may determine the details of the notification in consideration of the attribute information of the user (for example, whether or not the user is a paid member or a free member).

Figure 6:
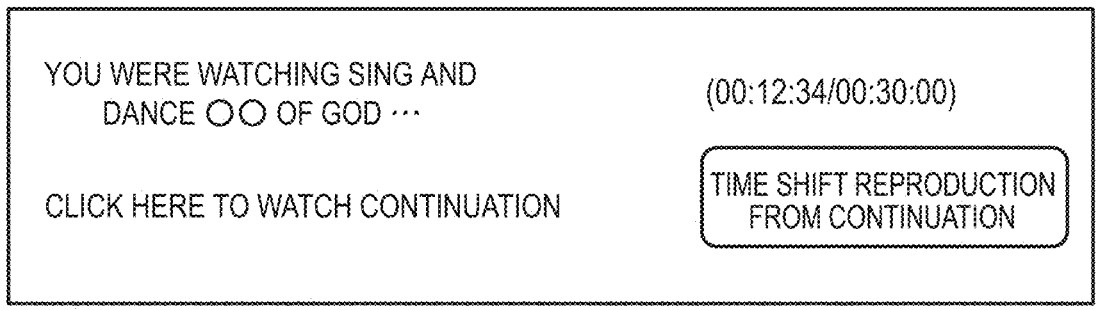
FIG. 6 is a diagram illustrating an example of a notification that is displayed on a terminal of a user who interrupts the viewing of a live broadcasting program.

For example, in a case where it is determined that the notification is necessary, as illustrated in FIG. 6, the notification determination unit 207 may instruct the notification unit 208 to notify that the viewing of the live broadcasting program of which the viewing is interrupted can be restarted from the viewing interrupted spot by the time shift reproduction. Such a notification is capable of including information for specifying the live broadcasting program of which the viewing is interrupted (for example, the title of the live broadcasting program), a message indicating that it is possible to view the live broadcasting program from the continuation (that is, the viewing interrupted spot), graphical user interface (GUI) parts for restarting the viewing of the live broadcasting program of which the viewing is interrupted from the viewing interrupted spot by the time shift reproduction (in the example of FIG. 6, a button of "Time Shift Reproduction from Continuation"), and the like. By including such GUI parts in the notification, it is possible for the user to restart the viewing of the live broadcasting program of which the viewing is interrupted from the viewing interrupted spot by the time shift reproduction without performing a cumbersome operation, for example, page transition a plurality of times. The notification is not limited to the example of FIG. 6, and in the spectator terminal 300, for example, the notification may be displayed in a Toast format.

Furthermore, in the example of FIG. 6, for example, there is a possibility that the moving image sharing system is designed such that the time shift reproduction of the live broadcasting program is not allowed until the end of the live broadcasting program. In such a case, for example, the notification determination unit 207 may further determine whether or not the live broadcasting program that is the notification target is ended. Whether or not the live broadcasting program is ended, for example, can be determined on the basis of the information of the live broadcasting program that is stored in the broadcasting program information storage unit 206. Then, in a case where the live broadcasting program is ended (that is, the time shift reproduction is immediately available), the notification determination unit 207 may instruct the notification unit 208 to perform the notification illustrated in FIG. 6. On the other hand, in a case where the live broadcasting program is before being ended, the notification determination unit 207 may instruct the notification unit 208 to perform a notification including the information for specifying the live broadcasting program of which the viewing is interrupted, the message indicating that it is possible to view the live broadcasting program from the continuation (that is, the viewing interrupted spot), GUI parts for reserving the time shift reproduction from the viewing interrupted spot of the live broadcasting program of which the viewing is interrupted, and the like.

Figure 7:
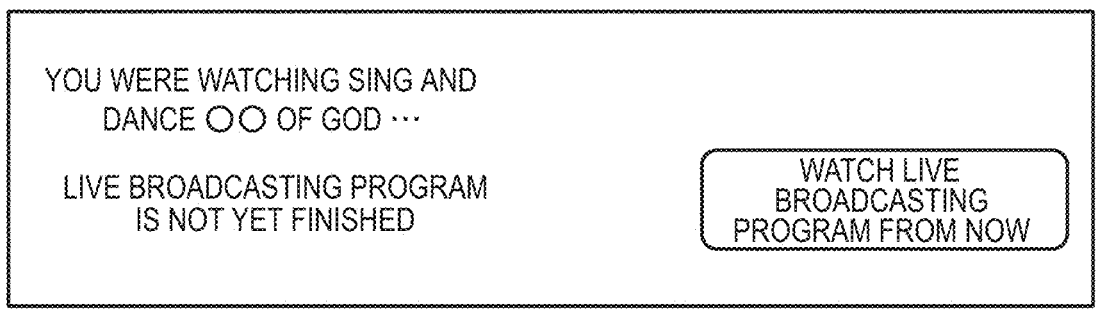
FIG. 7 is a diagram illustrating another example of the notification that is displayed on the terminal of the user who interrupts the viewing of the live broadcasting program.

In addition, for example, in a case where it is determined that the notification is necessary, the notification determination unit 207 may further determine whether or not the live broadcasting program that is the notification target is ended. In a case where it is determined that the notification is necessary and the live broadcasting program that is the notification target is not ended, as illustrated in FIG. 7, the notification determination unit 207 may instruct the notification unit 208 to notify that it is possible to view the live broadcasting program of which the viewing is interrupted in the live distribution. Such a notification is capable of including the information for specifying the live broadcasting program of which the viewing is interrupted, the message indicating that the live distribution (the live broadcasting) of the live broadcasting program is not finished, GUI parts for viewing the live broadcasting program of which the viewing is interrupted in the live distribution (in the example of FIG. 7, a button of "Watch Live Broadcasting Program from Now"), and the like. By including such GUI parts in the notification, it is possible for the user to view the live broadcasting program of which the viewing is interrupted in the live distribution without performing a cumbersome operation, for example, the page transition a plurality of times.

Furthermore, a plurality of types of notifications may be performed together. For example, in a case where there are a plurality of live broadcasting programs of which the viewing is interrupted by the user, a plurality of notifications, for example, a notification relevant to a live broadcasting program A and a notification relevant to a live broadcasting program B can be simultaneously or sequentially performed. Alternatively, even in a case where there is one live broadcasting program of which the viewing is interrupted by the user, a notification that it is possible to restart the viewing of the live broadcasting program from the viewing interrupted spot by the time shift reproduction (it is possible to reserve the time shift reproduction from the viewing interrupted spot) and a notification that it is possible to view the live broadcasting program of which the viewing is interrupted in the live distribution can be simultaneously or sequentially performed.

The notification unit 208 performs the notification that is instructed by the notification determination unit 207 with respect to the spectator terminal 300. The notification unit 208 may be the communication device described above, or may be the interface with respect to the communication device.

The notification unit 208, for example, transmits information necessary for the spectator terminal 300 to display a notification. Specifically, the notification unit 208 may transmit data itself of the notification to be displayed on the spectator terminal 300 or data to be the base thereof, or may transmit control data for displaying the notification on the spectator terminal 300 or data equivalent to the control data. Specifically, the notification unit 208 may transmit the information of the live broadcasting program that is associated with the user identification information, for example, the content identification information and/or the interrupted spot information to the spectator terminal 300. Then, the spectator terminal 300, for example, may prepare the notification in the Toast format illustrated in FIG. 6, FIG. 7, and the like, on the basis of the content identification information and/or the interrupted spot information that are received, and may display the notification.

The moving image data storage unit 209 stores the moving image data of the live broadcasting program that is distributed in the moving image sharing service. The moving image data of the live broadcasting program that is stored in the moving image data storage unit 209 is read out by the distribution control unit 203 in order for the time shift reproduction of the live broadcasting program. The moving image data storage unit 209 may be the auxiliary storage device described above, or may be the interface with respect to the auxiliary storage device.

Figure 8:
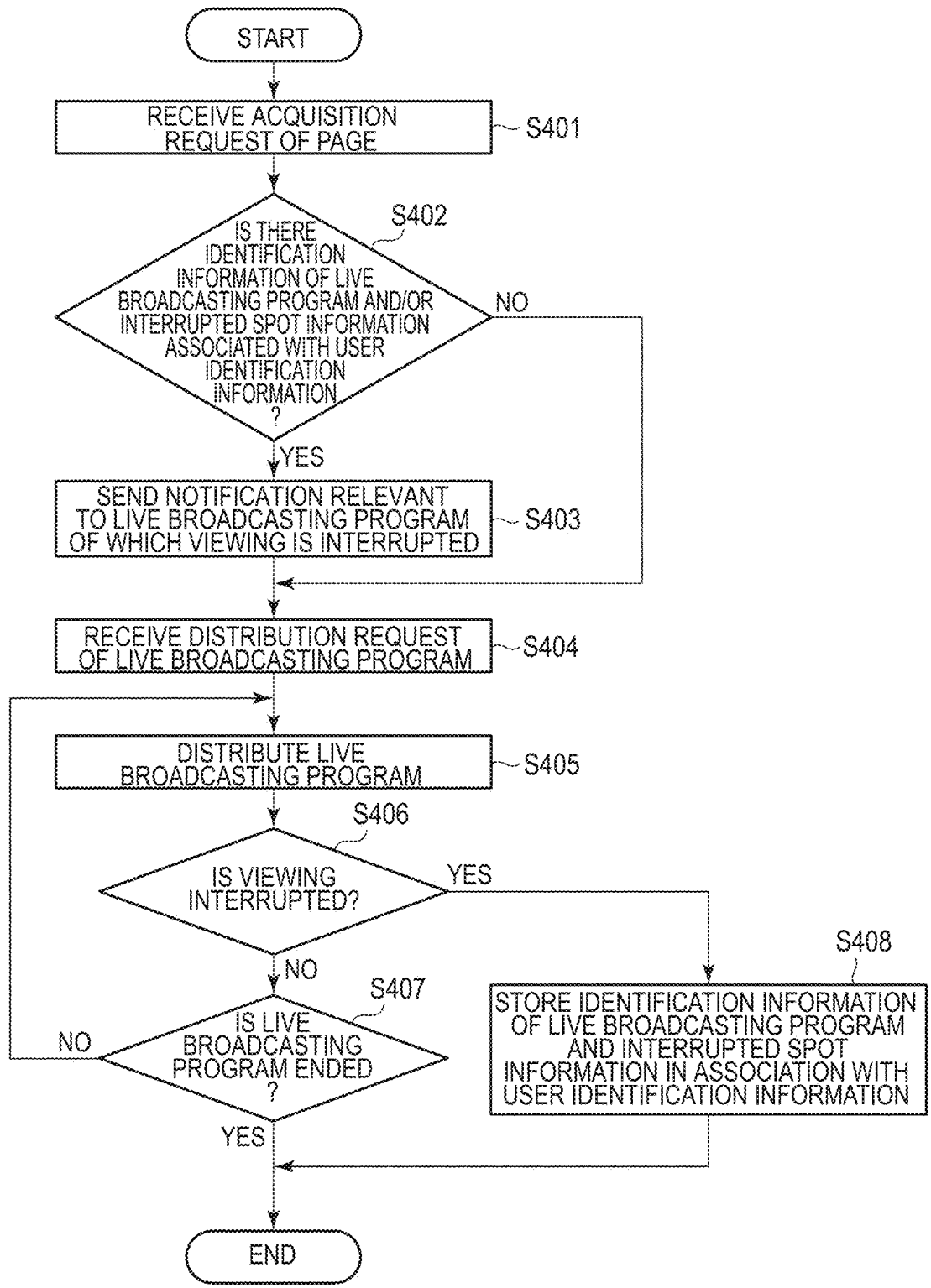
FIG. 8 is a flowchart illustrating an example of an operation of the distribution server of FIG. 2.

Next, an operation example of the distribution server 200 will be described by using FIG. 8. The operation example of FIG. 8 is started in a case where the acquisition request of the page that is a target of which the necessity of the notification is determined (for example, the initial acquisition request after the spectator terminal 300 and the distribution server 200 are temporarily disconnected, and are connected again, and the like) is transmitted from the spectator terminal 300.

The reception unit 201 receives the acquisition request of the page from the spectator terminal 300 (Step S401). Here, the spectator terminal 300 is logged in the moving image sharing service by using the user identification information for identifying the user. Therefore, the distribution server 200 is capable of identifying who is the user of the spectator terminal 300 that is the transmission source of the acquisition request received in Step S401. The distribution control unit 203 returns the page data as a response with respect to the received acquisition request, and sends the user identification information to the notification determination unit 207.

Next, the notification determination unit 207 determines whether or not the content identification information of the live broadcasting program and/or the interrupted spot information are stored in the interrupted information storage unit 205 by being associated with the user identification information indicating the transmission source of the acquisition request that is received in Step S401 (Step S402). In a case where it is determined that the information of the live broadcasting program is stored in the interrupted information storage unit 205, the processing proceeds to Step S403, and in a case where it is determined that the information of the live broadcasting program is not stored in the interrupted information storage unit 205, the processing proceeds to Step S404. In Step S402, as described above, the notification determination unit 207 may further determine the details of the notification.

In Step S403, the notification unit 208 notifies the spectator terminal 300 that is the transmission source of the acquisition request that is received in Step S401. The processing proceeds to Step S404 after Step S403. The notification, for example, may be the notification illustrated in FIG. 6 or FIG. 7, or may be a notification different from the notification in FIG. 6 or FIG. 7, and it is sufficient that the notification is at least a notification that is capable of reminding the user of the live broadcasting program of which the viewing is interrupted by the user. In Step S403, the notification unit 208 may transmit the data itself of the notification to be displayed on the spectator terminal 300 or the data to be the base thereof, or may transmit the control data for displaying the notification on the spectator terminal 300 or the data equivalent to the control data.

In Step S404, the reception unit 201 receives the distribution request of the live broadcasting program from the spectator terminal 300. For example, the spectator terminal 300 is capable of transmitting the distribution request in accordance with the selection of a link with respect to the live broadcasting program included in the received page data or the selection of a link with respect to the live broadcasting program included in the notification that is performed in Step S403.

The distribution unit 204 distributes the moving image data of the live broadcasting program that is requested in Step S404 to the spectator terminal 300 (Step S405). Step S405 is repeated until the viewing is interrupted or the live broadcasting program is ended (Step S406 and Step S407).

In a case where the viewing of the live broadcasting program is interrupted, the distribution control unit 203 stores the content identification information of the live broadcasting program of which the viewing is interrupted and the interrupted spot information in the interrupted information storage unit 205 in association with the user identification information indicating the user who interrupts the viewing (Step S408).

As described above, the distribution server according to the embodiment stores the user identification information and the information of the live broadcasting program by being associated with each other when the viewing of the live broadcasting program is interrupted, and the existence of the information of the live broadcasting program of which the viewing is interrupted is confirmed when the access is performed again from the user. Then, in a case where there is the information of the live broadcasting program of which the viewing is interrupted, the distribution server performs a notification for reminding the user of the existence of the information. Therefore, according to the distribution server, it is possible to support the user who interrupts the viewing of the real-time content of the live broadcasting program to restart the viewing. Specifically, it is possible to notify that it is possible to restart the viewing of the live broadcasting program from the viewing interrupted spot by the time shift reproduction, or to notify that it is possible to view the live broadcasting program of which the viewing is interrupted in the live distribution.

In addition, in a case where the user requests the time shift reproduction of the live broadcasting program of which the viewing is interrupted regardless of using the notification described above, the distribution server according to the embodiment may perform distribution control such that the viewing of the live broadcasting program can be restarted from the viewing interrupted spot by the time shift reproduction. Furthermore, even in a case where the notification described above is not performed at all, it is possible to improve accessibility with respect to the viewing interrupted spot, that is, it is possible to expect a support effect of the viewing restart of the user, by allowing the time shift reproduction from the viewing interrupted spot.

Modification Example

The embodiment described above, for example, can also be applied to a live broadcasting program of terrestrial broadcasting or satellite broadcasting. For example, in a case where the user views the live broadcasting program that is recorded in real time, and then, interrupts the viewing, the information of the live broadcasting program may be stored in a recording device (corresponding to the distribution server 200). Then, for example, the recording device may be configured such that the information of the live broadcasting program of which the viewing is interrupted is notified when a power source of a display device connected to the recording device (for example, a television set, corresponding to the spectator terminal 300) is turned on again.

The embodiment described above is merely a specific example for facilitating the understanding of the concept of the present invention, and is not intended to limit the scope of the invention. In the embodiment, constituents can be variously added, deleted, or converted within a range not departing from the gist of the invention.

Various function units described in the embodiment described above may be realized by using a circuit. The circuit may be a dedicated circuit that realizes a specific function, or may be a general-purpose circuit such as a processor.

At least a part of the processing of the embodiment described above can be realized by using a general-purpose computer as basic hardware. A program for realizing the processing described above may be provided by being stored in a computer-readable recording medium. The program is stored in a recording medium as a file in an installable format or a file in an executable format. The recording medium is a magnetic disk, an optical disk (a CD-ROM, a CD-R, a DVD, and the like), a magnetooptic disk (an MO and the like), a semiconductor memory, and the like. The recording medium may be any recording medium insofar as the recording medium is capable of storing a program, and is capable of being read by a computer. In addition, the program for realizing the processing described above may be stored on a computer (a server) connected to a network such as the internet, and may be downloaded to a computer (a client) through a network.

The invention claimed is:

1. A server comprising:
a storage unit storing first content identification information for identifying a first content and first interrupted spot information indicating a viewing interrupted spot of the first content in association with first user identification information for identifying a first user in a case where viewing of the first content during live distribution is interrupted in a first terminal logged in a content sharing service by using the first user identification information;
a determination unit determining whether or not at least one of the content identification information and the interrupted spot information that are associated with the first user identification information is stored in the storage unit in a case where the server is accessed from a second terminal logged in the content sharing service by using the first user identification information after the viewing of the first content is interrupted in the first terminal; and a notification unit notifying the second terminal that the viewing of the first content is capable of being restarted from the viewing interrupted spot by time shift reproduction in a case where it is determined that at least one of the first content identification information and the first interrupted spot information is stored in the storage unit by being associated with the first user identification information, wherein in a case where it is determined that at least one of the first content identification information and the first interrupted spot information is stored in the storage unit by being associated with the first user identification information, the determination unit further determines whether or not the live distribution of the first content is ended, and wherein, in a case where it is determined that the live distribution of the first content is not ended, the notification unit further notifies the second terminal that the first content is capable of being viewed in the live distribution, wherein, in a case where the viewing of the first content during the live distribution is interrupted in the first terminal, first terminal identification information for identifying the first terminal is stored in the storage unit by being associated with the first user identification information, in addition to at least one of the first content identification information and the first interrupted spot information, wherein, in a case where it is determined that at least one of the first content identification information and the first interrupted spot information is stored in the storage unit by being associated with the first user identification information, the determination unit further determines whether or not the first terminal identification information is coincident with second terminal identification information for identifying the second terminal, wherein, in a case where it is determined that an elapsed time between interruption of the live distribution on the first terminal and access of the server via the second terminal is less than a threshold value, the notification unit omits a notification with respect to the second terminal, wherein the threshold value is dependent upon a comparison between the first terminal identification information and the second terminal identification information.

2. A server comprising:

a storage unit storing first content identification information for identifying a first content and first interrupted spot information indicating a viewing interrupted spot of the first content in association with first user identification information for identifying a first user in a case where viewing of the first content during live distribution is interrupted in a first terminal logged in a content sharing service by using the first user identification information;

a determination unit (a) determining whether or not at least one of the content identification information and the interrupted spot information that are associated with the first user identification information is stored in the storage unit in a case where the server is accessed from a second terminal logged in the content sharing service by using the first user identification information after the viewing of the first content is interrupted in the first terminal, and (b) further determining whether or not the live distribution of the first content is ended in a case where it is determined that at least one of the first content identification information and the first interrupted spot information is stored in the storage unit by being associated with the first user identification information; and a notification unit notifying the second terminal that the first content is capable of being viewed in the live distribution in a case where it is determined that at least one of the first content identification information and the first interrupted spot information is stored in the storage unit by being associated with the first user identification information, and the live distribution of the first content is not ended, wherein, in a case where the viewing of the first content during the live distribution is interrupted in the first terminal, first terminal identification information for identifying the first terminal is stored in the storage unit by being associated with the first user identification information, in addition to at least one of the first content identification information and the first interrupted spot information, wherein, in a case where it is determined that at least one of the first content identification information and the first interrupted spot information is stored in the storage unit by being associated with the first user identification information, the determination unit further determines whether or not the first terminal identification information is coincident with second terminal identification information for identifying the second terminal, wherein, in a case where it is determined that an elapsed time between interruption of the live distribution on the first terminal and access of the server via the second terminal is less than a threshold value, the notification unit omits a notification with respect to the second terminal, wherein the threshold value is dependent upon a comparison between the first terminal identification information and the second terminal identification information.

3. The server according to claim 2, wherein in a case where it is determined that at least one of the first content identification information and the first interrupted spot information is stored in the storage unit by being associated with the first user identification information, and the live distribution of the first content is ended, the notification unit notifies the second terminal that the viewing of the first content is capable of being restarted from the viewing interrupted spot by time shift reproduction.

4. A non-transitory computer readable storage medium storing a program for allowing a computer to function as:

means of storing first content identification information for identifying a first content and first interrupted spot information indicating a viewing interrupted spot of the first content in a storage unit in association with first user identification information for identifying a first user in a case where viewing of the first content during live distribution is interrupted in a first terminal logged in a content sharing service by using the first user identification information;

means of determining whether or not at least one of the content identification information and the interrupted spot information that are associated with the first user identification information is stored in the storage unit in a case where the computer is accessed from a second terminal logged in the content sharing service by using the first user identification information after the viewing of the first content is interrupted in the first terminal; and means of notifying the second terminal that the viewing of the first content is capable of being restarted from the viewing interrupted spot by time shift reproduction in a case where it is determined that at least one of the first content identification information and the first interrupted spot information is stored in the storage unit by being associated with the first user identification information, wherein in a case where it is determined that at least one of the first content identification information and the first interrupted spot information is stored in the storage unit by being associated with the first user identification information, the means of determining further determines whether or not the live distribution of the first content is ended, and in a case where it is determined that the live distribution of the first content is not ended, the means of notifying further notifies the second terminal that the first content is capable of being viewed in the live distribution, wherein, in a case where the viewing of the first content during the live distribution is interrupted in the first terminal, first terminal identification information for identifying the first terminal is stored in the storage unit by being associated with the first user identification information, in addition to at least one of the first content identification information and the first interrupted spot information, wherein, in a case where it is determined that at least one of the first content identification information and the first interrupted spot information is stored in the storage unit by being associated with the first user identification information, the determination unit further determines whether or not the first terminal identification information is coincident with second terminal identification information for identifying the second terminal, wherein, in a case where it is determined that an elapsed time between interruption of the live distribution on the first terminal and access of the server via the second terminal is less than a threshold value, the notification unit omits a notification with respect to the second terminal, wherein the threshold value is dependent upon a comparison between the first terminal identification information and the second terminal identification information.

5. A non-transitory computer readable storage medium storing a program for allowing a computer to function as:

means of storing first content identification information for identifying a first content and first interrupted spot information indicating a viewing interrupted spot of the first content in a storage unit in association with first user identification information for identifying a first user in a case where viewing of the first content during live distribution is interrupted in a first terminal logged in a content sharing service by using the first user identification information;

means of (a) determining whether or not at least one of the content identification information and the interrupted spot information that are associated with the first user identification information is stored in the storage unit in a case where the computer is accessed from a second terminal logged in the content sharing service by using the first user identification information after the viewing of the first content is interrupted in the first terminal, and (b) further determining whether or not the live distribution of the first content is ended in a case where it is determined that at least one of the first content identification information and the first interrupted spot information is stored in the storage unit by being associated with the first user identification information; and means of notifying the second terminal that the first content is capable of being viewed in the live distribution in a case where it is determined that at least one of the first content identification information and the first interrupted spot information is stored in the storage unit by being associated with the first user identification information, and the live distribution of the first content is not ended, wherein, in a case where the viewing of the first content during the live distribution is interrupted in the first terminal, first terminal identification information for identifying the first terminal is stored in the storage unit by being associated with the first user identification information, in addition to at least one of the first content identification information and the first interrupted spot information, wherein, in a case where it is determined that at least one of the first content identification information and the first interrupted spot information is stored in the storage unit by being associated with the first user identification information, the determination unit further determines whether or not the first terminal identification information is coincident with second terminal identification information for identifying the second terminal, wherein, in a case where it is determined that an elapsed time between interruption of the live distribution on the first terminal and access of the server via the second terminal is less than a threshold value, the notification unit omits a notification with respect to the second terminal, wherein the threshold value is dependent upon a comparison between the first terminal identification information and the second terminal identification information.

* * * * *